May 23, 1939.  E. KIRCH  2,159,742
GAS PRESSURE ELECTRIC CABLE
Filed Jan. 14, 1936
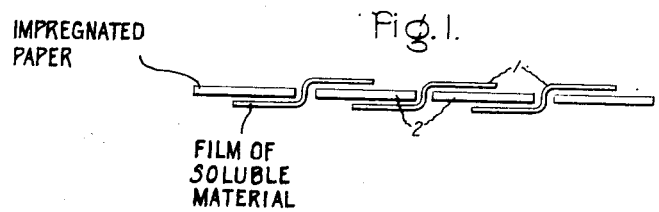
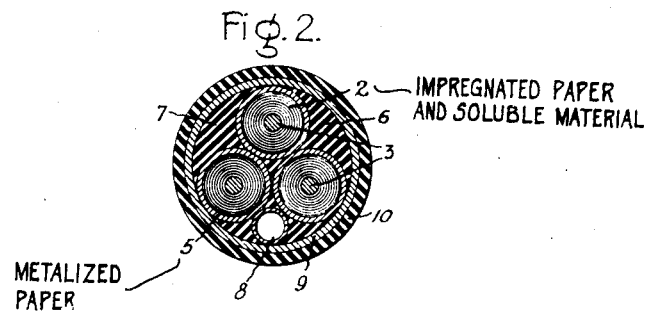
Inventor:
Ernst Kirch,
by Harry E. Dunham
His Attorney.

Patented May 23, 1939

2,159,742

UNITED STATES PATENT OFFICE 2,159,742

GAS PRESSURE ELECTRIC CABLE

Ernst Kirch, Berlin-Niederschoneweide, Germany, assignor to General Electric Company, a corporation of New York Application January 14, 1936, Serial No. 59,128
In Germany January 19, 1935

11 Claims. (Cl. 174—26)

Cables for transmitting electric power at high potentials generally have as insulation paper bands or tapes which are impregnated with oil or a compound of oil and resin. The impregnation may take place after the dry paper bands or tapes are wound in layers on the conductor or the bands may be impregnated prior to being wound. Both of these have been found to be good in practice and to satisfy the requirements for cables of medium and even higher potentials provided no great stresses are imposed on the insulation due to heating caused by the current in the conductor. A basic defect of such insulations, as is known, is due to the fact that temperature variations corresponding to varying loads and to the high coefficient of expansion of the impregnating medium cause movement of the latter within the layers of paper in such manner that the medium is gradually forced out of the insulation. As a result, there is found, as is known, voids or hollow spaces in which there is a comparatively lower pressure with the result that conditions for the occurrence of glow discharges even under low stressing are fulfilled. These glow discharges in turn cause chemical changes to take place in the impregnating medium with the result that gases are formed which in turn reduce the volume of the mass of the impregnating medium with the further result that the voids or hollow spaces become enlarged. In this way, the insulation is gradually destroyed until finally there takes place disruption discharges at the weakest points even under low potentials.

In order to reduce or obviate the injurious effects of voids, it has been proposed to fill the cable with a gas under high pressure with the intention of preventing by the action of the gas on the cable core or insulated wires of the core, the formation of voids within the insulating layers, or to fill up any existing voids with gas under high pressure or to reduce the area of the voids by an increase in the pressure.

Although the considerations upon which the said proposals or suggestions have been based are as old as cable practice itself, these suggestions could only be occasionally used in actual working, since when employing gas in the dielectric other difficulties simultaneously arise. For example, in the case of a cable with three insulated and metallized cores covered by one lead sheathing in common thereto, with the angular spaces between cores filled with gas under high pressure, such pressure does not prevent a slow longitudinal traveling or migration of the insulating mass, upon the heating of the cable through said spaces, from parts of the cable section located at a higher level, to sections located at a lower level with the result that the effective insulation at the higher points shows an impoverishment in mass of impregnating material and the mass there lost accumulates in the hollow spaces intended to be filled with gas. Moreover, because in pressure cables the angular spaces are quite free or only filled with unimpregnated fibrous substance, contrary to normal mass cables in which well founded value is placed upon a thorough saturation of the filler material, a shifting of the impregnating mass is favored to a high degree. There takes place, by the creation of larger hollow spaces, exactly the sources of faults and to a very high degree which faults are exactly those to be avoided by the use of gas pressure. Consequently, therefore, the advantage of a gas pressure with the ordinary and well tested impregnating masses is illusory and the objections in practice to the use of gas with such masses are well founded.

In order to provide a remedy, it has been proposed to provide the cable core or the individually insulated core wires with a flexible and gas-tight protecting sheathing and in this way to separate them from the gas spaces. To carry out this proposal in practice, the cable core, for want of some other flexible material has been surrounded by a lead jacket and such a cable after the application of a sheathing is drawn into steel pipes which are filled with a gas under high pressure, for example, about 10—15 atm. On account of the relative rigidity of the lead, it is necessary to use a considerably higher gas pressure than is necessary merely to improve the dielectric. This high pressure again affects the whole construction of the cable, since a lead jacket can no longer be used as the outer limitation of the pressure space, hence a steel pipe is necessarily employed. It is clear that the cable installations of this nature are comparatively complicated and expensive in construction and, furthermore, require a tedious and expensive mounting. These drawbacks are obviated by cables according to the present invention.

My invention has for its object to overcome the objections above mentioned and to provide a cable of improved construction wherein free migration of the thin medium used to impregnate the body of insulation on the conductor is restricted by the arrangement within the body of insulation and between the layers thereof of separately applied thin bodies of material that resist the tendency of said medium to pass out of the insulation.

In the accompanying drawing, Fig. 1 illustrates diagrammatically a body of insulation comprising layers or bands of paper and film, and Fig. 2 illustrates the invention as applied to a three core cable.

The invention is characterized as follows:

In the constructional elements of the insulation, that is, in the insulation layers, are arranged, prior to the introduction of the impregnating medium, substances which dissolve in the said medium and which thereby thicken it. The impregnation can therefore take place with the known and proved oil and compounds for this purpose, which at high temperatures are very thinly liquid and consequently permit a rapid thorough saturation or impregnation of the paper. Only by the dissolving process does the impregnating mass become thick in such manner that it no longer in the true sense represents a viscous liquid but is comparable to a thick and adhesive glue which adheres so firmly on the insulating layers that no noticeable shifting of the impregnating medium can take place. If oils are used as the impregnating medium, then preferably there are used for the thickening thereof natural or artificial resins, rubber, balata, gutta-percha, or similar substances. Other impregnating mediums, for example synthetic substances require additional substances corresponding to their character, and which are more or less easily soluble in the saturating substance. The introduction of these supplementary substances in the insulation can take place, for example, by means of thin sheets of the soluble material placed in or on the conductors as by painting or spraying them or between the insulating layers, or by the cable papers or other materials which are used for the insulation, for example, film foils being preliminarily impregnated with the additive substances or filled up or coated therewith in any suitable manner, as for example by brushing, spraying, etc.

The invention is not restricted to the above-mentioned example, in which more or less thick paper layers of the usual character are used, but naturally embraces also such cables the insulation of which is carried out using the inventive idea in any arrangement and superposing of different kinds of insulating material, for example with interspaced layers of liquid-tight film foils and paper bands. The last described method of execution has the advantage that even with excessive heating such as can for example take place with short circuits, no appreciable traveling of the impregnating material can take place. If the impregnation of the whole installation is to take place in the usual way after the application thereof in the dry state, the paper and film bands should be so arranged that they do not prevent the impregnation. A method of applying paper and film bands which is particularly suitable for the foregoing purpose and which has proved itself as advantageous and without faults in the cable dielectric is represented by Fig. 1 for a single layer of the cable insulation. The film bands 1 are wider than the paper bands and in carrying out the wrapping operation are so placed between the paper bands 2 that they cover with approximately one-half of their width the under side of a paper band and the next paper band partially on the upper side. It is best to make the film bands so wide that the edges, separated and held in position by a paper band, of two adjacent film band windings, one above the other, overlap, as is shown on the figure. In this way, the production of voids which extend in a radial direction over a series of insulating layers, is made impossible.

If previously impregnated papers are wound on the conductors so that a subsequent impregnation of the prepared wrapping is unnecessary, the film foils located between the paper layers are preferably wound with an overlap so that by a homogeneous and dense material the formation of voids of large dimensions in the radial direction is avoided. In principle, as film materials, all substances utilizable for insulating purposes can be employed, such for example as cellulose-acetates, cellulose-ester, cellulose-ethers and the like, or films of artificial resin bases, such for example as the polymerisates of acrylic acid or similar substances. Preferably, thermo-plastic films are used without additional adhesives, since by heating them at the overlapping points, an adhesion takes place and there are produced in this way closed separating layers. Instead of the uniform distribution of these film bands over the insulation, their preferred or exclusive use can take place at individual points where their barrier effect against any possible electric discharges or against the traveling of the insulating mass, appears particularly desirable. Thus, for example, the layer directly touching the conductor containing the gas channel means can be made substantially of film material or of the outer zones of the insulation, or both these. The result is at the same time attained in this way that during the fitting of the ends of the cable in sockets and in cable heads, the penetration of moisture from the channel means into the insulation is made difficult or even practically impossible.

The invention is utilizable in the same way with single and multiple conductor cables. With single conductor cables, either the longitudinal or strand spaces between the individual wires are made sufficiently large to form channels for conveying the gas under superatmospheric pressure, or if these appear insufficient, they may be artificially enlarged by the use of special strandings or in extreme cases, hollow conductors of any known form may be used. In principle, a gas channel of any known form can also be provided between the sheath and the core wire insulation, to serve alone or in combination with any channel in the conductor, for the conveyance of the gas under super-atmospheric pressure.

The placing of the cable under pressure as aforesaid takes place preferably with a neutral gas. Whether gases are used which are easily or difficultly soluble, is to be decided in each separate case. If it is desired to guard against a supplementary dissolving of gas in the impregnating mass, the latter can be saturated with gas by known processes.

Fig. 2 shows by way of example a cable made according to the invention. Each of the three conductors 3 of the triple conductor cable shown is surrounded by insulation 2 which is a fibrous material insulation impregnated or saturated according to the invention, and in which layers of fibrous material with layers of film material can alternate in the above described manner or be otherwise interspaced. The insulation of each core is closed by a wrapping 5 of metallized paper. The intermediate or filler spaces 6 are either not filled up with any solid substance so that the gas under high pressure can occupy these or they are filled with unimpregnated fibrous material 7 or perforated tubes 8, supporting helical windings and the like, by means of which the circulation of the compressed gas within the angular spaces is not restricted. The cable cores are enclosed by a sheath 9 which may consist either of lead or some other waterproof substance. Over the waterproof sheath there is a bandage of metal or insulating substance 10 serving to increase the resistance to pressure of the waterproof sheath. Finally, a protecting covering constructed in the usual way is or may be placed over the whole.

The advantage of the cable described as compared with known cables having a gas tight protective sheathing, such as lead, and located in a steel pipe consists in a considerable reduction in cost by dispensing with the dividing layer or sheathing and also in the utilization of a considerably lower gas pressure, so that for cables of the construction described, apart from special and exceptional cases, in general unarmoured, armoured or bandaged lead jackets can be used as sufficient outer limitation of the pressure spaces or of the insulation which is under pressure. The placing or keeping the interior of the cable under pressure can in principle take place in any desired manner. It is a matter of indifference in this whether care be taken by the use of special means, as for example by the use of reducing valves, to keep the gas pressure within narrow limits or to permit more or less considerable variations, for example in the case of temperature variations. It is also without influence upon the essence of the invention whether supplementary containers with constant or variable capacity are used, or whether care be taken to bring about intermittently or continuously a delivery of gas corresponding to the absorption taking place or to losses due to faults.

What I claim as new and desire to secure by Letters Patent of the United States is:

1. A cable comprising a conductor, a body of permeable insulation arranged in layers surrounding the conductor, a single impregnating medium common to all of the layers of the insulation, an enclosing sheath, means existing as separate identities prior to impregnation located between layers of the insulation and acting to restrict migration of the impregnating medium within the body when the cable is in operation from a part of the cable located at one level to that located at a lower level, and an unrestricted longitudinally extending channel also within the sheath containing a body of gas under super-atmosphereic pressure which has free access to the body of insulation.

2. A cable comprising a stranded conductor, a body of permeable paper insulation arranged in layers around the conductor, an impregnating medium which is common to all of said layers, an enclosing sheath, a channel means located within the sheath and extending longitudinally thereof, said channel means containing a body of gas under super-atmospheric pressure which has free access to the insulation, and insulating means located in said body between the layers thereof and acting to restrict migration of the impregnating medium into the channel means when the cable is heated.

3. A cable comprising a conductor, a body of permeable insulation arranged in layers surrounding the conductor, an impregnating medium for the insulation which is common to all of the layers thereof initially of liquid consistency, a substance existing as a separate identity between certain of the layers prior to impregnating the insulation, which later is acted upon by the medium to form a glue-like adhesive coating for adjacent surfaces of the layers to reduce the tendency of the medium to migrate from a high position to a lower position, a sheath for the cable, and unrestricted means located within the sheath for introducing gas under super-atmospheric pressure to the interior of the sheath where it acts upon the insulation.

4. A cable comprising a conductor, a body of permeable insulation arranged in layers and surrounding the conductor, an impregnating medium for the body which initially has the characteristics of a liquid, a dry supplemental substance applied to the body of insulation between layers which exists in film form prior to impregnation, and which is soluble in the impregnating medium and changes it from a liquid into a thick adhesive material to oppose migration, and an unrestricted channel means within the sheath extending lengthwise thereof which contains a body of gas under super-atmospheric pressure and freely conveys it from end to end of the cable.

5. A cable comprising a conductor, a body of insulation comprising paper bands wrapped around the conductor, an impregnating material contained in the insulation which has a tendency to migrate when heated, a sheath impervious to the material and gas enclosing the body, films of insulating material interspaced between layers of the paper bands in overlapping relation thereto to restrict said migration, and a channel means within the sheath containing a body of gas under superatmospheric pressure.

6. A cable comprising a conductor, a body of permeable insulation surrounding the conductor and arranged in layers, an unrestricted perforated channel containing gas under super-atmospheric pressure, an impregnating material for the insulation which is common to all of the layers of the insulation and initially has the characteristics of a liquid, films of insulating material initially existing as such prior to impregnation and located within the body between layers containing a substance which is largely soluble in the impregnating material and which on being dissolved imparts to the liquid material between said layers an adhesive glue-like characteristic to reduce migration of the liquid into the gas containing channel through the wall thereof, and a sheath which closely surrounds the insulation and also retains the gas.

7. A cable comprising a conductor, a body of permeable insulation applied thereto in layers, a single thin impregnating medium for the layers of insulation which is common to said layers and tends to migrate therefrom as the cable is heated, an enclosing sheath, and other insulating means of heat softening film-like character soluble in the medium located between layers of the said body and applied thereto prior to impregnation, which act to restrict the tendency of said medium to migrate within said body.

8. A cable comprising a conductor, a body of permeable insulation applied in layers surrounding the conductor, an impregnating medium for the insulation which is initially thin and penetrates the individual layers of the entire body, an enclosing sheath for the insulation and a substance inserted between layers of the body prior to the impregnation thereof which is initially unaffected by the impregnating medium but which when heated softens and thickens the impregnating medium thereby restricting migration of said medium within the body.

9. A cable comprising a conductor, a body of permeable insulation surrounding the conductor and arranged in layers, an enclosing sheath, an impregnating medium which initially is in thin liquid form and saturates the entire body, a substance soluble in the medium existing as a film prior to impregnation of the body located between layers of the body and extending longitudinally of the body which dissolves to a limited extent in the medium and in so doing thickens the said medium, the substance adhering to the surfaces of the layers and forming a coating therefor, thereby restricting migration of the medium when the cable is subject to operating conditions, and a perforated channel within the sheath containing a non-conducting gas under super-atmospheric pressure.

10. A cable comprising a conductor, a body of permeable paper insulation surrounding the conductor and arranged in layers, an enclosing sheath, a single impregnating medium which saturates the entire body, and a substance soluble in the medium applied between layers of the body prior to impregnation which when dissolved by the medium due to the action thereof and to the application of heat thickens the aforesaid medium and causes it to adhere firmly on the surfaces of the layers of said body and form a coating thereon which restricts free migration of the medium within the body as the cable is subject to heating and cooling cycles when in operation.

11. A cable comprising a conductor, a body of permeable insulation arranged in layers surrounding the conductor, an enclosing sheath, an impregnating medium which is initially in thin liquid form and saturates the entire body, and a substance applied to and existing in sheet form between layers of the body prior to impregnation which is soluble in the impregnating medium and when so dissolved thickens said medium and causes it adhesively to adhere to the surfaces of adjacent layers in the form of a glue-like coating to restrict free migration of the medium both radially and longitudinally.

ERNST KIRCH.